(12) United States Patent
Ramb et al.

(10) Patent No.: US 8,992,164 B2
(45) Date of Patent: Mar. 31, 2015

(54) TURBOCHARGER

(75) Inventors: Thomas Ramb, Worms (DE); Dietmar Metz, Meckenheim (DE)

(73) Assignee: BorgWarner Inc., Auburn Hills, MI (US)

( * ) Notice: Subject to any disclaimer, the term of this patent is extended or adjusted under 35 U.S.C. 154(b) by 498 days.

(21) Appl. No.: 13/510,036

(22) PCT Filed: Nov. 16, 2010

(86) PCT No.: PCT/US2010/056774
§ 371 (c)(1),
(2), (4) Date: May 16, 2012

(87) PCT Pub. No.: WO2011/066130
PCT Pub. Date: Jun. 3, 2011

(65) Prior Publication Data
US 2013/0004298 A1    Jan. 3, 2013

(30) Foreign Application Priority Data
Nov. 27, 2009  (DE) .......................... 10 2009 056 049

(51) Int. Cl.
*F01D 17/12*  (2006.01)
*F01D 17/16*  (2006.01)
*F02B 37/24*  (2006.01)
*F02C 6/12*  (2006.01)

(52) U.S. Cl.
CPC .............. *F01D 17/165* (2013.01); *F02B 37/24* (2013.01); *F02C 6/12* (2013.01); *Y02T 10/144* (2013.01); *F05D 2220/40* (2013.01)
USPC ........... 415/155; 415/159; 415/162; 415/163; 415/164

(58) Field of Classification Search
USPC .......................... 415/155, 159, 162, 163, 164
See application file for complete search history.

(56) References Cited

U.S. PATENT DOCUMENTS

| 4,741,666 | A   | * | 5/1988  | Shimizu et al. ............... 415/158 |
|-----------|-----|---|---------|---------------------------------------|
| 6,471,470 | B2  | * | 10/2002 | Yoshimura et al. ........... 415/160   |
| 6,623,240 | B2  | * | 9/2003  | Ertl et al. ..................... 415/163 |
| 8,186,944 | B2  | * | 5/2012  | Tries et al. .................... 415/164 |
| 8,328,520 | B2  | * | 12/2012 | Boening et al. ............... 416/160  |
| 2006/0112690 | A1 | * | 6/2006 | Hemer ............................ 60/602 |
| 2009/0094979 | A1 | * | 4/2009 | Eissler et al. ................... 60/602 |

* cited by examiner

*Primary Examiner* — Igor Kershteyn
(74) *Attorney, Agent, or Firm* — A. Michael Tucker; Stephan A. Pendorf; Patent Central LLC

(57) ABSTRACT

The invention relates to a turbocharger (1) with variable turbine geometry (VTG), having a turbine housing (2) with a supply duct (9) for exhaust gases, having a turbine rotor (4) which is rotatably mounted in the turbine housing (2); and having a guide grate (18), which surrounds the turbine rotor (4) radially at the outside, which has a blade bearing ring (6), which has a multiplicity of guide blades (7) which have in each case one blade shaft (8) mounted in the blade bearing ring (6), which has an adjusting ring (5) which is operatively connected to the guide blades (7) by means of associated blade levers (20) fastened to the blade shafts (8) at one of their ends, with each blade lever (20) having, at the other end, a lever head (23) which can be placed in engagement with an associated engagement recess (24) of the adjusting ring (5), and which has a bearing arrangement (28) for fixing the adjusting ring (5) to the blade bearing ring (6), wherein the bearing arrangement (28) is formed as a plain bearing arrangement pin.

20 Claims, 2 Drawing Sheets

TURBOCHARGER

Figure 1:
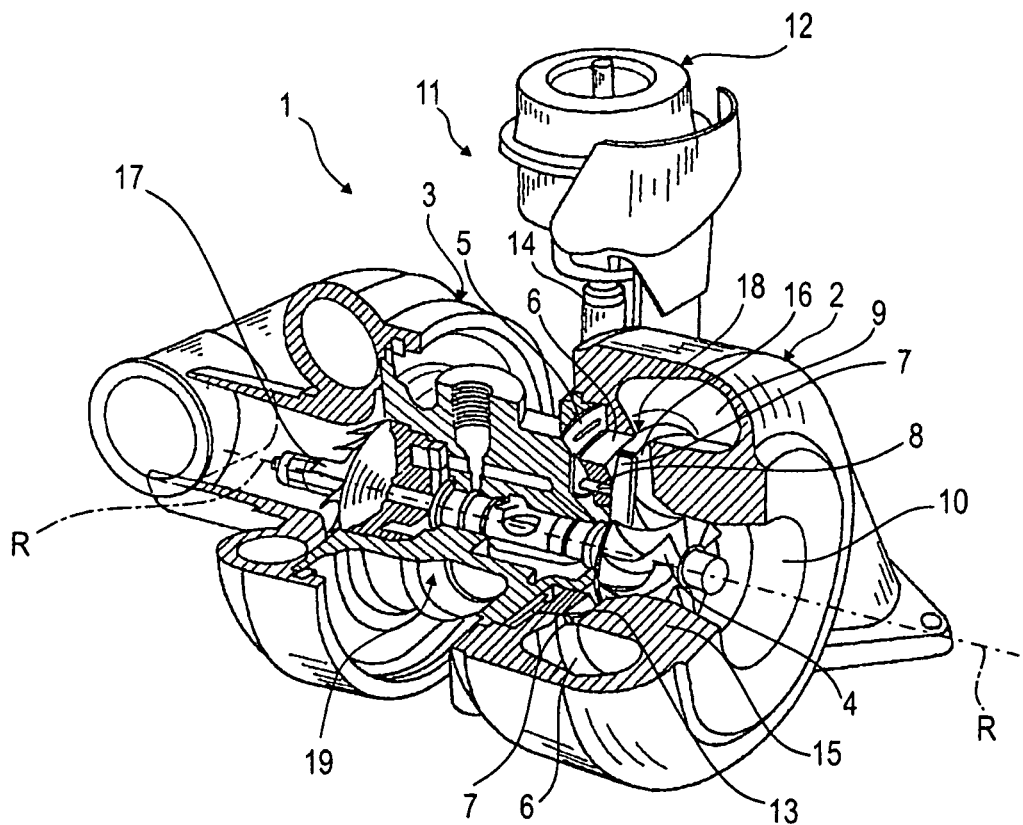

A turbocharger of said type is known from EP 2 018 480 A1.

It is therefore an object of the present invention to provide a turbocharger which permits a simplification of the construction and of the assembly of the guide grate or guide apparatus.

Since the bearing arrangement of the adjusting ring on the blade bearing ring is formed as a plain bearing arrangement with an axial stop, both the axial and also the radial positioning of the adjusting ring are performed. The blade levers absorb only the adjusting forces without having to form an axial stop for the adjusting ring. As a result of the modified placement of the adjusting ring close to the center of the blade shaft, the blade bearing forces caused by the adjusting forces introduced at one end of the blade shaft are reduced.

Figure 2:
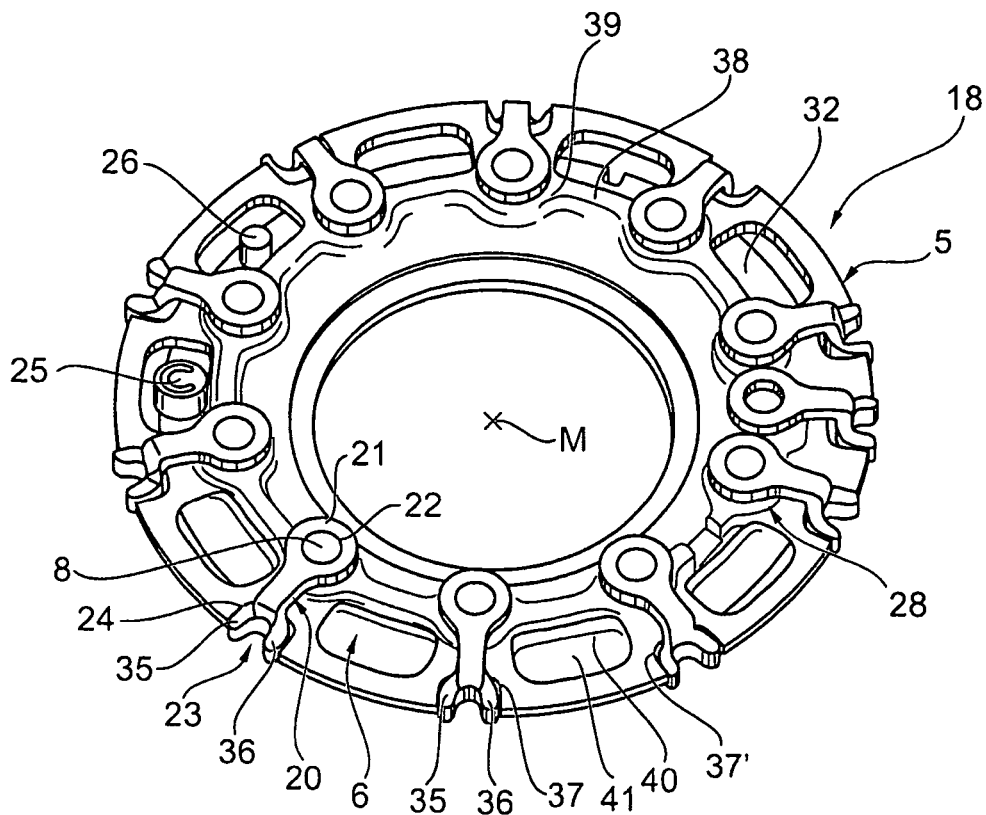
Figure 3:
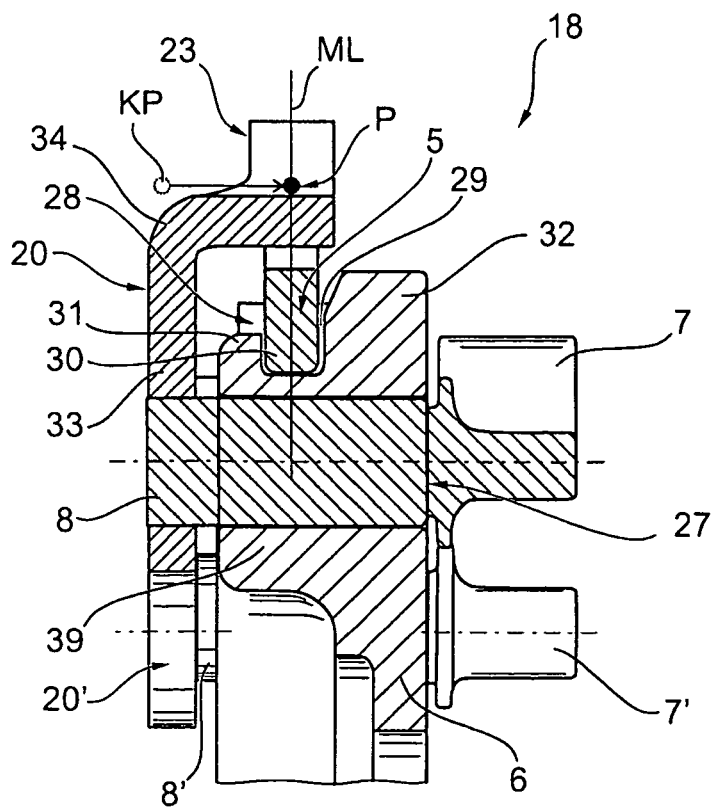

Further details, advantages and features of the invention will emerge from the following description of an exemplary embodiment on the basis of the drawing, in which:

FIG. 1 shows a sectional perspective illustration of the basic design of a turbocharger according to the invention, FIG. 2 shows a perspective illustration of a first embodiment of a guide grate according to the invention; and FIG. 3 shows a partial sectional illustration of the guide grate according to FIG. 2.

FIG. 1 illustrates a turbocharger 1 according to the invention which has a turbine housing 2 and a compressor housing 3 which is connected thereto via a bearing housing 19. The housings 2, 3 and 19 are arranged along a rotational axis R. The turbine housing 2 is shown partially in section in order to illustrate the arrangement of a blade bearing ring 6 as part of a radially outer guide grate 18 which has a multiplicity of guide blades 7 which are distributed over the circumference and which have pivot axles or blade shafts 8. In this way, nozzle cross sections are formed which are larger or smaller depending on the position of the guide blades 7 and which act on the turbine rotor 4, which is mounted in the center on the axis of rotation R, to a greater or lesser extent with exhaust gas of an engine, which exhaust gas is supplied via a supply duct 9 and discharged via a central connecting piece 10, in order via the turbine rotor 4 to drive a compressor rotor 17 seated on the same shaft.

To control the movement or the position of the guide blades 7, an actuating device 11 is provided. Said actuating device 11 may be of any desired design, but in a preferred embodiment has a control housing 12 which controls the control movement of a plunger element 14 fastened thereto, in order to convert the movement of said plunger element 14 into a slight rotational movement of an adjusting ring 5 situated behind the blade bearing ring 6. Formed between the blade bearing ring 6 and an annular part 15 of the turbine housing 2 is a free space 13 for the guide blades 7. To be able to ensure said free space 13, the blade bearing ring 6 has integrally formed spacers 16. In the example, three spacers 16 are arranged on the circumference of the blade bearing ring 6 at angular intervals of in each case 120°. In principle, however, it is possible to provide more or fewer spacers 16 of said type.

FIG. 2 shows a partial view of a first embodiment of the guide grate 18 according to the invention on an enlarged scale.

Illustrated representatively for all of the guide blades of said guide grate 18 is a blade lever which is denoted by the reference symbol 20 and which, at one end, has a fastening ring 21 with a recess 22 in which one end of the blade shaft 8 is fixed.

A lever head 23 of the blade lever 20 is arranged in an engagement recess 24 of the adjusting ring 5 and is therefore in engagement with the adjusting ring 5. As can also be seen from FIG. 2, for this purpose, the lever head 23 is provided with a first contact limb 35 and a second contact limb 36 which fit into the engagement recess 24 of the adjusting ring 5. The blade lever 20 may be produced by means of punching and subsequent forming. By means of the shaping of the two contact limbs, it is ensured firstly that as large a contact surface with the engagement recesses 24 as possible is generated and secondly that the contact surface of the contact limbs is not adversely affected by the punching process. Alternatively, an MIM production process may also be used.

The blade bearing ring 6 is provided, on its radially outer side 40, with depressions 41 between in each case two adjacent engagement recesses 24. Furthermore, the blade bearing ring 6 has an encircling annular wall 38 which is elevated in relation to the annular body 32 and which is provided, correspondingly to the blade spacing, with contact regions 39 for the fastening ring 21 of each blade lever 20, which contact regions 39 are matched to the size and shape of the fastening ring 21.

The adjusting ring 5 is mounted in the blade bearing ring 6 by means of a plain bearing arrangement 28 (see FIG. 3). As illustrated in FIG. 2, the blade bearing ring 6 also has fixed to it a first stop 25, which defines a minimum stop of an adjustment of the adjusting ring 5 in relation to the blade bearing ring 6, and a second stop 26, which defines a maximum stop of an adjustment of the adjusting ring 5 in relation to the blade bearing ring 6.

The assembly of the blade bearing ring 6 and adjusting ring 5 takes place here in that the adjusting ring 5 is placed between the depressions 41 of the blade bearing ring 6 and is subsequently (in the manner of a bayonet connection) rotated into the sliding surfaces of said depressions 41 by means of a rotation by half of one blade spacing, such that as a result of the engagement of the guide lugs 30 into the guide slots 29, a radial plain bearing arrangement with an axial stop at both sides is formed. After the fastening rings 21 of the blade levers 20 have been welded to the blade shafts 21, the first stop 25 and the second stop 26 are pressed into the blade bearing ring 6. As a result of the angle of rotation which is restricted by the stops 25 and 26, the adjusting ring 5 and blade bearing ring 6 can thereafter no longer be separated or pulled apart.

The illustration of FIG. 3 shows a part of a guide grate 18. FIG. 3 shows a sectional illustration of the blade shaft 8, to one end of which is fastened one of the guide blades 7 and to the other end of which is fastened one of the blade levers 20. Also shown in FIG. 3 are an adjacently arranged blade lever 20' and its associated blade shaft 8' and guide blade 7'. The blade shaft 8 is mounted in a blade bearing arrangement 27 in the interior of the blade bearing ring 6. As can also be seen from FIG. 3, the blade bearing ring 6 is formed at its contact region 39 with a bulge 31 and has a guide slot 29 between the bulge 31 and the annular body 32. Mounted in a sliding fashion in the guide slot 29 is a guide lug 30 of the adjusting ring 5, which guide lug 30 projects radially inward in relation to a central point M (see FIG. 2) of the guide grate 18.

The blade lever 20 has a bend 34 which deflects the blade body 33 thereof through 90° in the direction of the lever head 23. In this way, the lever head 23 comes into engagement with the adjusting ring 5 in alignment with a radial central line ML of the adjusting ring 5. The introduction of the adjusting force by the blade lever 20 therefore takes place at a position P situated on the central line ML, and the blade bearing forces caused by the adjusting force, and the resulting tilting moments on the blade shafts, are reduced considerably in comparison with the force introduction point KP of the prior art.

LIST OF REFERENCE SYMBOLS

1 Turbocharger
2 Turbine housing
3 Compressor housing
4 Turbine rotor
5 Adjusting ring
6 Blade bearing ring
7 Guide blades
8 Blade shaft
9 Supply duct
10 Axial connecting piece
11 Actuating device
12 Control housing
13 Free space for guide blades
14 Plunger element
15 Annular part of the turbine housing
16 Spacer/spacer cam
17 Compressor rotor
18 Guide grate/guide apparatus
19 Bearing housing
20 Blade lever
21 Fastening ring
22 Recess
23 Lever head
24 Engagement recesses
25 First stop (minimum stop)
26 Second stop (maximum stop)
27 Blade bearing arrangement
28 Plain bearing arrangement
29 Guide slot
30 Guide lug
31 Bulge
32 Annular body
33 Blade body
34 Bend
35 Contact limb
36 Contact limb
37, 37' Engagement recesses
38 Annular wall
39 Contact regions
40 Radially outer side
41 Depressions
M Central point
ML Central line
P Force introduction point
KP Force introduction point of the prior art

The invention claimed is:

1. A turbocharger (1) with variable turbine geometry (VTG)
  having a turbine housing (2) with a supply duct (9) for exhaust gases,
  having a turbine rotor (4) which is rotatably mounted in the turbine housing (2); and
  having a guide grate (18),
    which surrounds the turbine rotor (4) radially at the outside,
    which has a blade bearing ring (6),
    which has a multiplicity of guide blades (7) which have in each case one blade shaft (8) mounted in the blade bearing ring (6),
    which has an adjusting ring (5) which is operatively connected to the guide blades (7) by means of associated blade levers (20) fastened to the blade shafts (8) at one of their ends, with each blade lever (20) having, at the other end, a lever head (23) which can be placed in engagement with an associated engagement recess (24) of the adjusting ring (5), and
    which has a bearing arrangement (28) for fixing the adjusting ring (5) to the blade bearing ring (6),
  wherein
    the bearing arrangement (28) is formed as a plain bearing arrangement.

2. The turbocharger as claimed in claim 1, wherein the plain bearing arrangement (28) is formed by a guide slot (29) in the blade bearing ring (6) and a guide lug (30), which projects radially inward as viewed in relation to the central point (M) of the guide grate (18), on the adjusting ring (5).

3. The turbocharger as claimed in claim 1, wherein the guide slot (29) is delimited axially by a bulge (31) which projects outward in relation to the central point (M) and by an annular body (32) of the blade bearing ring (6).

4. The turbocharger as claimed in claim 1, wherein the blade levers (20) are of bent design.

5. The turbocharger as claimed in claim 4, wherein the blade levers (20) have a blade body (33) to which the lever head (23) is attached via a bend (34) which extends approximately into the center of the blade shaft (8).

6. The turbocharger as claimed in claim 1, wherein the lever head (23) is of approximately U-shaped design with two contact limbs (35, 36).

7. The turbocharger as claimed in claim 1, wherein the blade bearing ring (6) has engagement recesses (24, 37, 37') matched to the shape of the lever head (23).

8. The turbocharger as claimed in claim 6, wherein that surface of the contact limbs (35, 36) which comes into contact with the engagement recesses (24) is not a punched surface.

9. The turbocharger as claimed in claim 1, wherein the blade bearing ring (6) has an encircling annular wall (38) which is elevated in relation to the annular body (32) and which is provided, correspondingly to the blade spacing, with contact regions (39) matched to the size and shape of the fastening ring (21).

10. The turbocharger as claimed in claim 9, wherein on the radially outer side (40) of the annular wall (38), depressions (41) are provided between the contact surfaces (39).

11. A guide grate (18) for a turbocharger (1) with variable turbine geometry (VTG), which guide grate (18) surrounds a turbine rotor (4) of the turbocharger (1) radially at the outside and has the following parts:
  a blade bearing ring (6),
  a multiplicity of guide blades (7) which have in each case one blade shaft (8) mounted in the blade bearing ring (6),
  an adjusting ring (5) which is operatively connected to the guide blades (7) by means of associated blade levers (20) fastened to the blade shafts (8) at one of their ends, with each blade lever (20) having, at the other end, a lever head (23) which can be placed in engagement with an associated engagement recess (24) of the adjusting ring (5), and
  a bearing arrangement (28) for fixing the adjusting ring (5) to the blade bearing ring (6),
  wherein
    the bearing arrangement (28) is formed as a plain bearing arrangement.

12. The guide grate as claimed in claim 11, wherein the plain bearing arrangement (28) is formed by a guide slot (29) in the blade bearing ring (6) and a guide lug (30), which projects radially inward as viewed in relation to the central point (M) of the guide grate (18), on the adjusting ring (5).

13. The guide grate as claimed in claim 11, wherein the guide slot (29) is delimited axially by a bulge (31) which projects outward in relation to the central point (M) and by an annular body (32) of the blade bearing ring (6).

14. The guide grate as claimed in claim 11, wherein the blade levers (20) are of bent design.

15. The guide grate as claimed in claim 14, wherein the blade levers (20) have a blade body (33) to which the lever head (23) is attached via a bend (34) which extends approximately into the center of the blade shaft (8).

16. The guide grate as claimed in claim 11, wherein the lever head (23) is of approximately U-shaped design with two contact limbs (35, 36).

17. The guide grate as claimed in claim 11, wherein the blade bearing ring (6) has engagement recesses (24, 37, 37') matched to the shape of the lever head (23).

18. The guide grate as claimed in claim 16, wherein that surface of the contact limbs (35, 36) which comes into contact with the engagement recesses (24) is not a punched surface.

19. The guide grate as claimed in claim 11, wherein the blade bearing ring (6) has an encircling annular wall (38) which is elevated in relation to the annular body (32) and which is provided, correspondingly to the blade spacing, with contact regions (39) matched to the size and shape of the fastening ring (21).

20. The guide grate as claimed in claim 11, wherein on the radially outer side (40) of the annular wall (38), depressions (41) are provided between the contact surfaces (39).

* * * * *